United States Patent
Kurz

(10) Patent No.: US 8,238,973 B2
(45) Date of Patent: Aug. 7, 2012

(54) METHOD FOR ADMINISTERING THE AUTHORIZATION OF MOBILE TELEPHONES WITHOUT A SIM CARD

(75) Inventor: Michael Kurz, Vienna (AT)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 12/811,703

(22) PCT Filed: Nov. 7, 2008

(86) PCT No.: PCT/EP2008/009415
§ 371 (c)(1),
(2), (4) Date: Sep. 3, 2010

(87) PCT Pub. No.: WO2009/095048
PCT Pub. Date: Aug. 6, 2009

(65) Prior Publication Data
US 2011/0136470 A1    Jun. 9, 2011

(30) Foreign Application Priority Data
Jan. 31, 2008    (DE) .......................... 10 2008 007 085

(51) Int. Cl.
*H04W 68/00* (2009.01)
*H04M 1/66* (2006.01)

(52) U.S. Cl. .......................... 455/558; 455/410; 455/411

(58) Field of Classification Search .......... 455/410–411, 455/558
See application file for complete search history.

(56) References Cited

U.S. PATENT DOCUMENTS

| | | | |
|---|---|---|---|
| 5,553,314 A | 9/1996 | Grube | |
| 6,356,769 B1 | 3/2002 | Vehmas | |
| 6,615,057 B1 | 9/2003 | Pettersson | |
| 6,928,299 B1 | 8/2005 | Rinne | |
| 7,053,771 B2 * | 5/2006 | Hussmann | ............... 340/539.11 |
| 7,580,678 B2 | 8/2009 | Byman-Kivivuori | |
| 7,603,107 B2 | 10/2009 | Ratert | |
| 7,689,254 B2 | 3/2010 | Tanneberger | |

(Continued)

FOREIGN PATENT DOCUMENTS

DE    29910700 U    7/2000

(Continued)

OTHER PUBLICATIONS

"SIM as Secure Key Storage in Communication Networks" Wireless and Mobile Communications, p. 55, Mar. 1, 2007 XP031065976; ISBN:978-0-7695-2796-3.

*Primary Examiner* — Marisol Figueroa
(74) *Attorney, Agent, or Firm* — Andrew Wilford

(57) ABSTRACT

The present invention relates to a method for administering the authorization of at least one mobile telephone (5) relative to a mobile communications network (8), wherein the mobile telephone (5) is design for near-field communication (7) and in case a mobile radio card (6) is not present in the mobile telephone (5), the authorization thereof takes place by an external device (1) having one or more mobile radio card(s) (10) and a device (3) for near-field communication (7) with said mobile telephone (5), and wherein near-field communication (7) takes place between the external device (1) and the mobile telephone (5) for authorizing, and a connection is permitted to be established to the mobile communications network (8) after successful authorization by the external device (5).

14 Claims, 5 Drawing Sheets

U.S. PATENT DOCUMENTS

| | | |
|---|---|---|
| 7,920,827 B2 | 4/2011 | Byman-Kivivuori |
| 2003/0211863 A1 | 11/2003 | Neifer |
| 2004/0176071 A1 | 9/2004 | Gehrmann |
| 2004/0203355 A1 | 10/2004 | Light et al. |
| 2005/0255885 A1 | 11/2005 | Majewski |
| 2006/0113043 A1 | 6/2006 | Imazeki |
| 2006/0232437 A1 | 10/2006 | Gutowski et al. |
| 2006/0293028 A1 | 12/2006 | Gadamsetty |
| 2007/0042808 A1 | 2/2007 | Ruuttu |
| 2008/0051142 A1 | 2/2008 | Calvet |
| 2008/0081611 A1* | 4/2008 | Hoyt et al. ............ 455/425 |
| 2010/0197224 A1* | 8/2010 | Lahdenniemi et al. ...... 455/41.1 |

FOREIGN PATENT DOCUMENTS

| | | |
|---|---|---|
| DE | 10100824 A | 7/2002 |
| DE | 102004027304 A | 12/2005 |
| DE | 102004027311 A | 2/2006 |
| GB | 2365699 A | 2/2002 |

* cited by examiner

Fig. 1 -- Prior Art

METHOD FOR ADMINISTERING THE AUTHORIZATION OF MOBILE TELEPHONES WITHOUT A SIM CARD

CROSS REFERENCE TO RELATED APPLICATIONS

This application is the US national phase of PCT application PCT/EP2008/009415, filed 7 Nov. 2008, published 6 Aug. 2009 as WO2009/095048, and claiming the priority of German patent application 102008007085.8 itself filed 31 Jan. 2008, whose entire disclosures are herewith incorporated by reference.

The present invention relates to a method of administering authorization of a mobile telephone or several mobile telephones with respect to a mobile-communication network in which the mobile telephone(s) is or are capable of communication through a near-field link. Further, the invention concerns a system for applying the method.

To authenticate mobile telephones with respect to their mobile-communication networks, as well as for their authorization to gain access to the mobile-communication network, identification modules in the form of mobile-radio cards are used for mobile telephones. These types of identification modules are, for example, SIM (Subscriber Identification Module) or USIM (Universal Subscriber Identification Module) cards. Frequently, a mobile-communication subscriber would like to use several mobile terminals for mobile radio telephone service at the same time. This is the case, for example, when the mobile-communication subscriber has a self-contained mobile telephone, as well as a mobile telephone that is integrated into his motor vehicle, and the subscriber would like to use the full functionality of both mobile telephones at all times. In this case each device must have its own identification module and they must all be associated with the same mobile radio telephone service subscriber number (MSISDN, Mobile Subscriber Integrated Digital Network Number).

Beyond that, frequently individuals carry more than one mobile telephone with different identification modules, for example, a personal and a business mobile telephone that can be reached using different telephone numbers. For this case, mobile-communication terminals are known that have a so-called dual SIM card solution and that make it possible to use at least two SIM cards simultaneously in one mobile telephone. These end user devices are, however uncommon and disproportionately expensive.

In practice, it is also frequently the case that an SIM card is exchanged between two or even more terminals. However, this is extremely cumbersome, because, as a rule, the cover of the housing and the telephone battery must be removed. As the mounting bracket of the SIM card is not designed for frequent exchange, mechanical damage and contact problems occur with the identification module or the SIM card bracket.

It is therefore the object of the invention to provide a simple and comfortable alternative to the manual exchange of the mobile-radio card, in order to guard against damage caused by exchange to the mobile-radio card or to the mobile telephone, and to simultaneously make several mobile radio telephone service terminals usable by using only one mobile-radio card, so that the use of individual mobile-radio cards in each mobile radio telephone service terminal can be eliminated.

This object is attained in accordance with the invention by the characteristics of claim 1, as well as with the system for carrying out the method according to claim 13. Advantageous embodiments of the inventions are contained in the dependent claims, and also explained in the following description.

This way, it is particularly advantageous that, in the method of administering the authorization of a mobile telephone or several mobile telephones with respect to a mobile-communication network, the mobile telephone(s) is/are capable of near-field communication, and if a mobile-radio card is not present in the mobile telephone that is authorized by an external device provided with one or more mobile-radio card(s) and a device for near-field communication with this/these mobile telephone(s), the authorization being effected between the external device and mobile telephone by near-field communication and the establishment of a connection to the mobile-communication network being permitted after successful authorization by the external device. In accordance with the invention, the authorization process of one or several mobile telephones with respect to the mobile-communication network is thus administered by the external device that is designed as small wireless device, and can be carried along by the user.

The proposed solution thus offers the possibility to administer this one or one or several of the mobile radio telephone service terminals with respect to the mobile-communication network by means of an additional external device that holds the necessary identification module with respect to the mobile-communication network, in particular a mobile-radio card in the form of an SIM or USIM card, in particular to take over their authorization including authentication with respect to the mobile-communication network. For this purpose, the external device as well as the mobile telephone(s) has/have devices for wireless near-field communication by means of which authorization data can be exchanged between the devices.

Preferably, the near-field communication between the mobile telephone and external device takes place by RFID (Radio Frequency Identification). This communication technology has the advantage that it can be realized especially economically, as RFID elements and RFID readers are already mass market products at low price levels. Further, this technology has the advantage that it can easily be integrated into a chip, or integrated into a chip together with a mobile-radio card. Alternatively, or in combination, a near-field communication can also take place by Bluetooth or infrared, where the mobile telephone and the external device have corresponding communication devices in this case.

Existing RFID technologies are currently based on standards such as, for example, ISO 14443A, ISO 14443B or ISO 14443C that are used for the authentication of, for example, electronic access systems, vending machines, etc. In the case of RFIDs, a differentiation is made between active and passive units. In contrast to passive RFIDs, active RFIDs require their own power supply. Thus, it is particularly advantageous in accordance with the invention that the external device is equipped with a passive RFID device and that the mobile telephone is provided with an active RFID device. The external device can, in this case, get by without any power supply as its passive RFID device receives the energy it requires from the electromagnetic communication near-field. The danger of failure of the external device as a consequence of low battery level can thus be avoided.

In an advantageous embodiment of the invention, the external device and the mobile telephone can communicate as client-server in near-field communication, where the external device represents a server and the mobile telephone a client.

Preferably, the mobile telephones and the external device can each have a respective identifier by means of which they can be identified by the external device. In this manner, a distinction of the mobile telephones and direct addressing of an authorization data exchange to a certain mobile telephone is possible, such that in addition, access by unauthorized devices is avoided. This way, an identifier can preferably be associated with an RFID device.

It is particularly advantageous when the one mobile telephone or the mobile telephones is/are registered prior to its/their authorization in the external device. In this manner, the authorization of the corresponding mobile telephone—in the event of communication request or in the case of an incoming communication event such as a call or an electronic message [SMS]—can take place without delay, so that, for example, in the case of a communication request of a mobile telephone, its identifier is transmitted via the RFID near-field to the external device and compared there with the registered entry/entries, and an authorization of the mobile telephone takes place when its identifier agrees with the registered identifier.

Further, it is particularly advantageous that the authorization take place by the external device even when the mobile telephone that is to be authorized or the mobile telephones that are to be each authorized have a mobile-radio card, in particular an SIM or USIM card. Existing mobile telephones in the market can therefore also be used in the future. The mobile telephone(s) can then be configured in such a way that, in the event of a communication event, as to await authorization by the external device. This means that the phone is preprogrammed such that the mobile-radio card inserted into the external device has priority over the identification module of the mobile telephone, and the mobile telephone, in the event of a communication event in the form of a communication request or in the form of an incoming call, awaits authorization by the external device. Alternatively, the pre-setting of the prioritized external device is performed by manual adjustment in the mobile telephone by the mobile radio telephone service user, at the beginning or subsequently, and is changed when needed.

Further, the near-field communication can preferably be encrypted and/or be protected by password. This way, a high degree of safety during data exchange is ensured via the near field.

Preferably, in the case of a communication request of a registered mobile telephone or in the event of an incoming communication event, a test of the authorization of the mobile telephone and a test of at least one existing active connection of the registered mobile telephones can take place. The test of the authorization can thereby include the test as to whether the mobile telephone is registered with the external device and is therefore authorized to communicate with it, as well as if a logging of the mobile telephone into the mobile-communication network was successful.

To avoid collisions during data exchange using the communication connection with the mobile-communication network it is further advantageous when the communication set-up takes place only when no registered mobile telephone has an active connection. This means that a connection via the mobile-communication network is to be set up only when none of the registered mobile telephones is involved in a telephone call. Alternatively, a communication connection can, however, be established in addition to an already existing active connection of a different mobile telephone when the external device has at least one second mobile-radio card by means of which an additional mobile telephone can be authorized with respect to the mobile-communication network.

In the following, the invention is described in conjunction with embodiments and the enclosed figures. Therein:

The following is a description of an embodiment of the solution of the administration of the authorization according to the invention of one or several mobile radio telephone service terminals simultaneously, hereinafter identified as user devices AG, with respect to the mobile-communication network by means of a wireless connection to an external device EG, with reference to FIGS. 1 to 5. In the following, in particular mobile telephones are to be understood as user devices. The external device EG has a dual interface chip that represents a combined RFID/SIM device or RFID/USIM device, that is an SIM or USIM mobile-radio card and a radio frequency identification (RFID) unit that are housed with a common interface on a smartcard.

Figure 1:
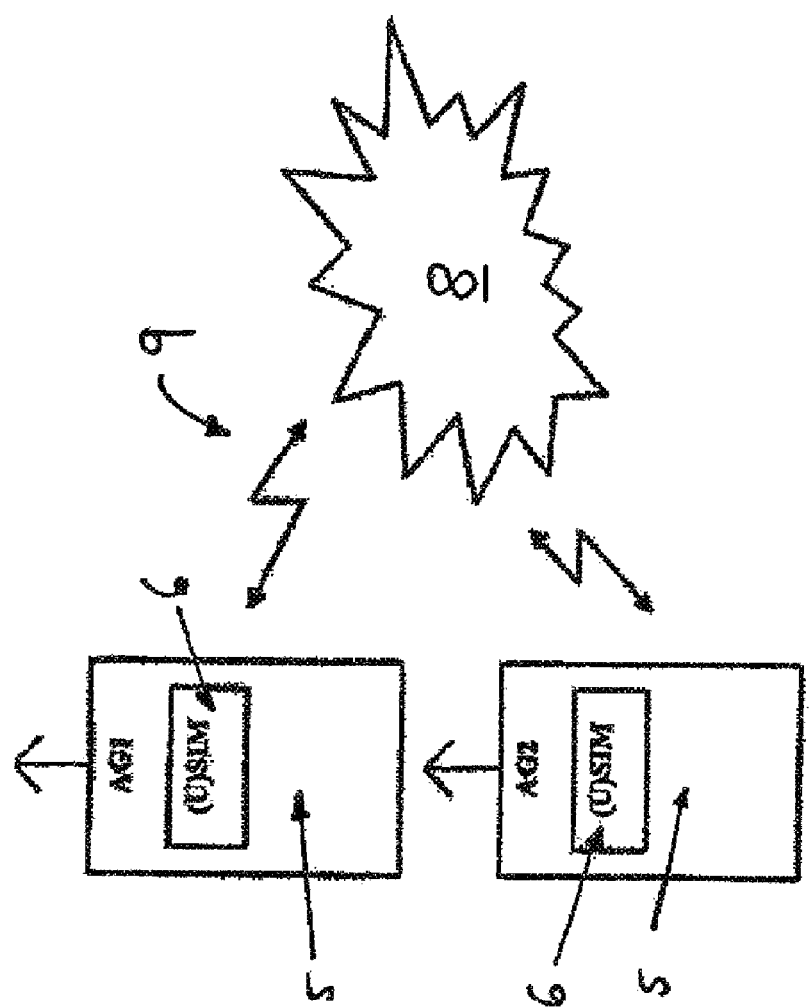
FIG. 1 is a schematic representation of the administration of the authorization of mobile radio telephone service terminals in a mobile-communication network according to prior art.

FIG. 1 shows the state of the art during the authorization of user devices 5 with respect to a mobile-communication network 8. The user devices UD1 and UD2 each have an SIM or USIM card 6 that holds an unambiguous MSISDN that authenticates the user devices 5 with respect to the mobile-communication network 8. To establish a communication connection 9 via the mobile-communication network 8, the user devices 5 must log into the mobile-communication network 8 so that they are authenticated. Further, after logging in, an authorization of the user devices 5 takes place for receiving or setting up a communication connection 9, whereby the corresponding user device 5 sends an authorization inquiry to the mobile-communication network 8 based on the data stored on their mobile-communication cards 6.

Figure 2:
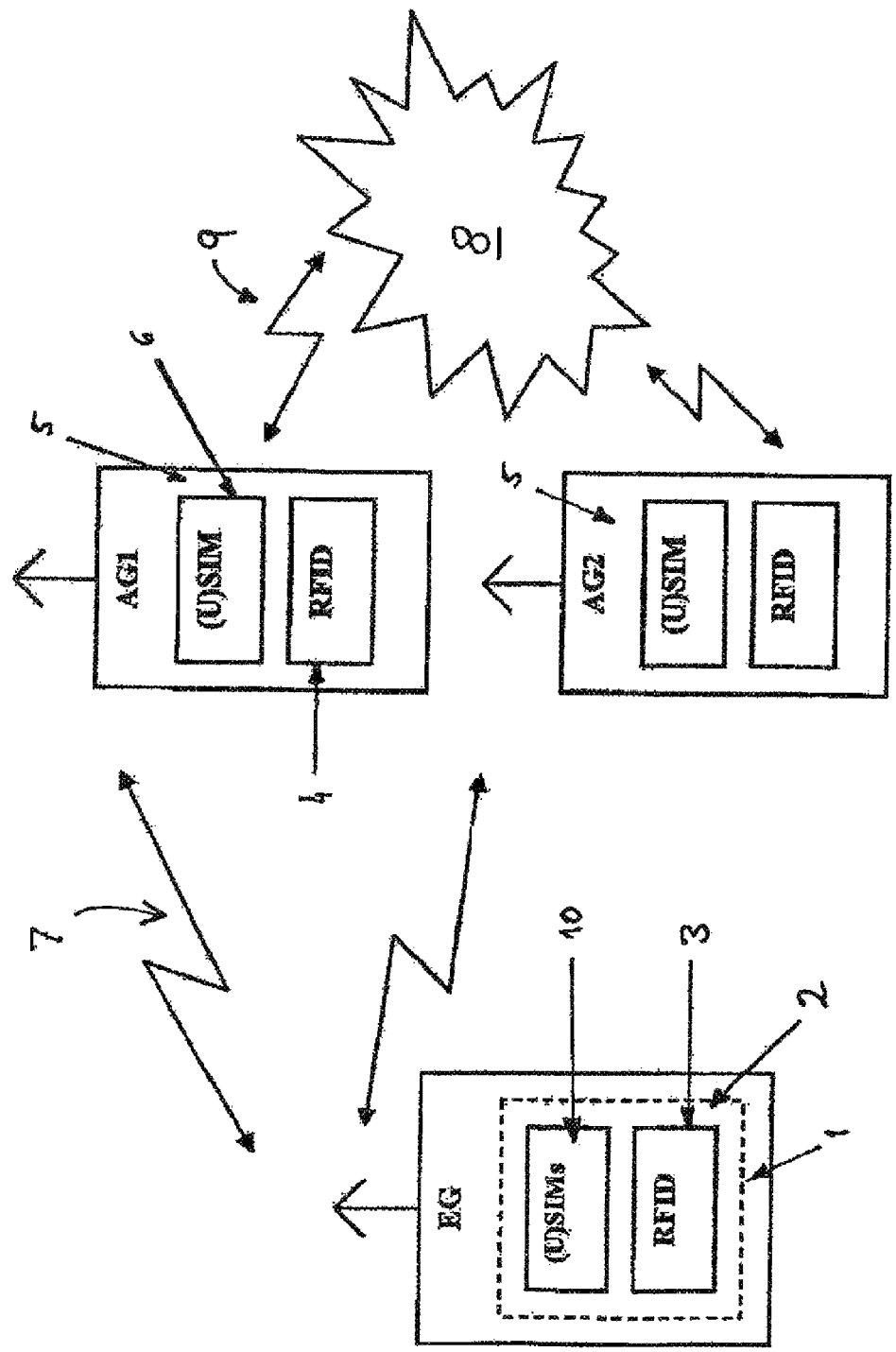
FIG. 2 is a schematic representation of administering and authorizing mobile radio telephone service terminals in accordance with the invention in the mobile-communication network by means of an external device.

The suggested solution according to FIG. 2 offers, in contrast to the solutions currently available in the market with the disadvantages discussed above, the superb possibility of authenticating and authorizing, by means of an additional external device 1, one or more mobile user devices 5 with one or more combined RFID/SIM—or RFID-USIM device(s) 2 for mobile-communication networks 8. The combined RFID/mobile-radio card device 2 has an RFID device 3 and a mobile-radio card 10, for example, an SIM or USIM card.

The solution in accordance with the invention thus does not use the function of the mobile telephone-service provider by simply forwarding a call, but uses so-called server:client (EG: UD) connection 1:n, that is a mobile-radio card 3 in the external device 1 with respect to a number n of user devices. Further, even connections m:n can be administered, that is one or more mobile-radio cards 10 in the external device 1, in contrast to one or several user devices 5. RFID functions as the connection interface between the server and the clients, the authorization data or even other data being exchanged when needed by wireless transmission 7 by RFID. Dependent on the RFID system used (e.g. active/passive), the external device 1 or its RFID/mobile-communication card device(s) 2 in the event of their design with a passive RFID medium 3, does not even require a dedicated electricity supply because the RFID/mobile-communication card device(s) 2 is/are supplied with energy by the communication near-field link 7 of the active RFID reader 4 of the mobile device 5 or in the case of several user devices 5 all by their active readers.

The transmission coverage in RFID technology amounts to an average of below 0.5 m. Although additional coverage can be achieved for some RFID technologies with the support of amplifiers, where, however, the energy consumption increases dramatically. If, in place of the passive RFID device 3 in the external device 1, an active device is used, the coverage increases significantly, on average up to approximately 10 m. However, the external device requires its own power supply in this case. The size of a combined SIM/RFID element 2 or USIM/RFID element 2 is comparable with an existing SIM or USIM card (such as, for example, combined RFID-(U)SIM). In contrast to that, RFID readers 4 require more space, they can, however, also be integrated into the relatively compact currently existing user devices 5.

Figure 3:
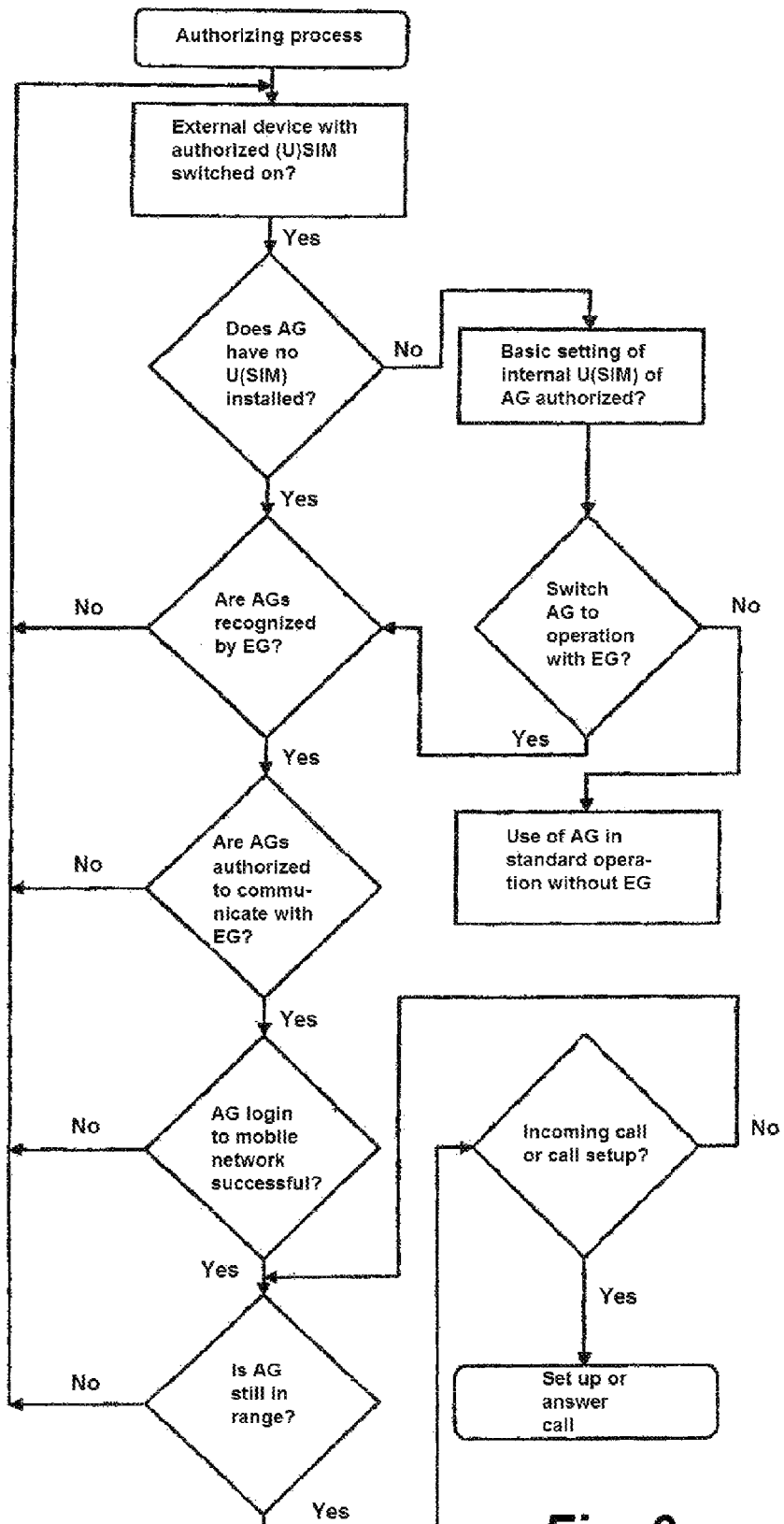
FIG. 3 shows the authorization process of the mobile-communication terminals.
Figure 4:
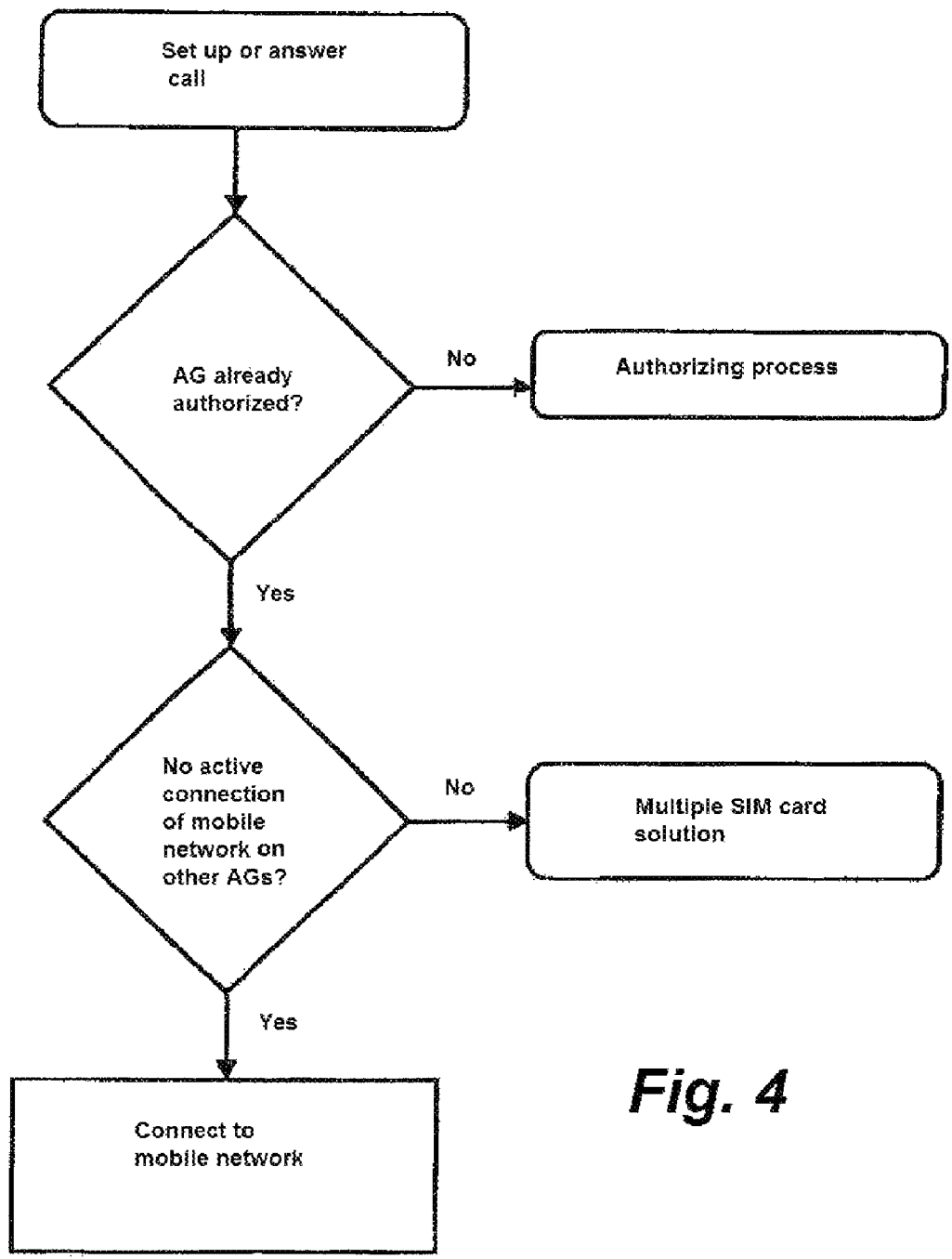
FIG. 4 shows the call set-up or call receiving by a mobile radio telephone service terminal by means of an external device.

Optionally, a user device 5 can also be used in the conventional manner by SIM/USIM 6, that is even without an external device 1. If the external device 1 is used and an SIM/USIM card 6 is in the end device 5, an unambiguous authentication procedure or process must be defined as shown in FIG. 3. Here, two possibilities can be realized:

Possibility 1: The inserted SIM/US1M card 6 has TOP priority and the external device 1 has low priority.

Possibility 2: The authorization path that determines whether the external device 1 or inserted SIM/USIM 6 has precedence when performing the authorization is manually configured by the user in the user device 5, where basic settings are optionally possible by the mobile telephone-service provider.

Concerning the authorization by the external device 1 for several user devices 5, with which the user can make telephone calls, the following scenarios are conceivable:

Application 1: Establishing a connection. The establishment of a connection takes place with any user device 5, however, always only one user device 5 at a time, see FIG. 4.

Application 2: Accepting a call. Accepting a call takes place with any user devices 5, however always only one user device 5 at a time, see FIG. 4.

Figure 5:
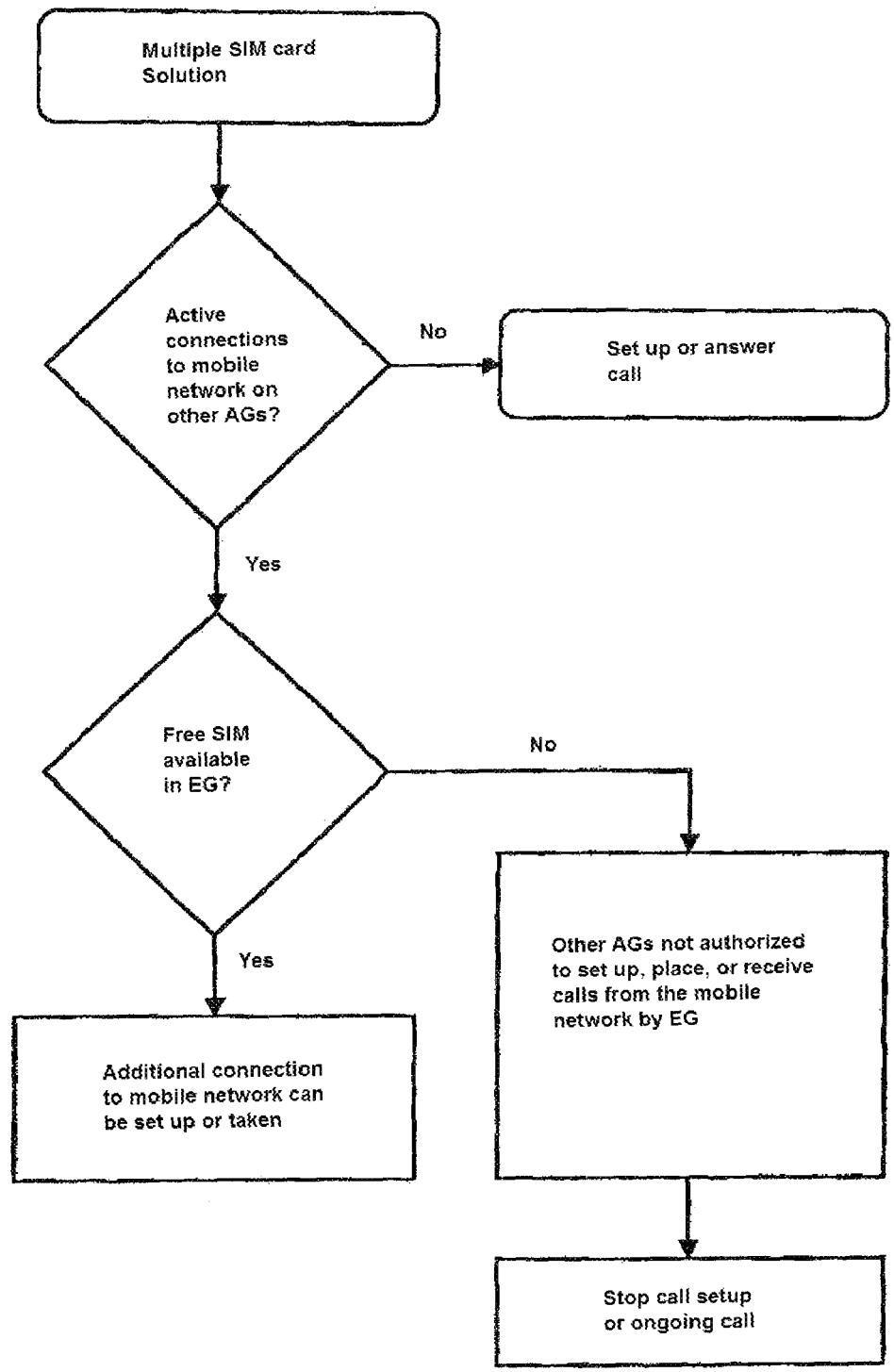
FIG. 5 shows a multiple SIM card solution in the external device.

Application 3: Several connections 9 or several SIMs/USIMs simultaneously. This can, for example, take place by means of two SIMs 10 in the external device 1. Here, two connections 9 by the user device 5 to the mobile-communication network are possible at a time. The RFID medium used must then be anti-collision capable. A process flow related to this scenario is shown in FIG. 5.

The communication link 7 between the external device 1 and the user devices 5 is encrypted for safety reasons or is at least password-protected. For communication, the individual devices 1, 5 have respective unambiguous identifiers, in order to ensure their unambiguousness (this is also important for anti-collision) and in order to preclude access by unauthorized devices.

Instead of or in addition to the RFID connection, a data exchange can also take place by Bluetooth or infrared, as a result of which the range of application of the authorization administration in accordance with the invention in increased. Further, to devices that exist in the market that support primarily Bluetooth and/or infrared communication, the functionality of the method in accordance with the invention can be made available by near-field communication with Bluetooth or infrared, so that the external device 1 also has a device for communication via Bluetooth and/or infrared.

In the method according to the invention, the advantage for the user is that his mobile devices 5, in particular mobile telephones, are authorized in an easy way and, in the final analysis, are connected with his mobile telephone-service provider, including the additional advantage of being able to simultaneously use additional functions by using the RFID component, for example, for authentication and performing noncash payments at vending machines or using the RFID unit as access medium to electronic locking systems.

Optionally, the external device can be used in order to avoid frequent changing of SIM/USIM cards, since the bracket of the SIM/USIM was also not designed for a frequent exchange, because most of the time, the SIM bracket is located underneath the accumulator and is not designed mechanically appropriate.

The advantage for the mobile telephone-service provider is the use of the same control processes and authorization processes as those that are used for existing SIM/USIM cards.

The invention claimed is:

1. A method of administering authorization of at least one mobile telephone with respect to a mobile-communication network in which the mobile telephone that may hold a mobile radio card and is capable of communication through a near-field link, the method comprising the steps of:
   providing an external device with at least one mobile-radio card and with a device for near-field communication with the mobile telephone;
   taking over authorization of the mobile telephone with respect to the mobile-communication network by means of the external device;
   configuring the mobile telephone such that it can only establish a connection with the mobile-communication network when authorized by the external device through the near-field link;
   before authorization, registering the mobile phone in the external device; and
   if a mobile-radio card is not present in the mobile telephone,
     checking through the near-field link if the mobile telephone is registered in the external device and thereafter, if the mobile telephone is registered,
     authorizing the mobile telephone with respect to the mobile-communication network by the external device and thereafter, if the mobile telephone was successfully authorized by the mobile-communication network,
     permitting establishment of a connection set-up from the mobile telephone to the mobile-communication network by the external device, and thereafter
     checking if the mobile telephone is logged onto the mobile-communication network.

2. The method according to claim 1, wherein the near-field communication takes place by RFID.

3. The method according to claim 1 wherein the external device has a passive RFID device and the mobile telephone has an active RFID device for the near-field communication.

4. The method according to claim 1 wherein, in near-field communication, the external device forms a server and the mobile telephone a client.

5. The method according to claim 1, further comprising the step of
   associating the mobile telephone with an identifier by means of which it is identified by the external device.

6. The method according to claim 1, further comprising the step of:
if the mobile telephone holds a mobile-radio card, effecting the authorization by the external device.

7. The method according to claim 1 wherein the near-field communication is encrypted or password-protected.

8. The method according to claim 1 wherein the external device administers the authorization of at least two mobile telephones registered with the external device.

9. The method according to claim 8, further comprising the steps, in the event of a communication request of a mobile telephone or in the event of an incoming communication event, of:
testing the authorization of the corresponding mobile telephone and
testing for existing active connections of the registered mobile telephones.

10. The method according to claim 9, wherein the set-up of the communication connection takes place, if using only one mobile-radio card in the external device, only when no registered mobile telephone has an active connection or, if using several registered mobile telephones with several mobile-radio cards, an additional active connection is possible.

11. The method defined in claim 1, wherein the communication established by authorization is two-way communication.

12. The method defined in claim 6, further comprising the step of:
configuring the mobile telephone to await authorization by the external device on occurrence of a communication event.

13. A system for carrying out the method according to claim 1, comprising at least one mobile telephone for communication via a mobile-communication network and an external device with a near-field communication device and one or more mobile-radio cards, the near-field communication devices of the mobile telephone and external device being capable of transmitting and receiving authorization data, the external device being configured to authorize the mobile telephone with respect to a mobile-communication network, the mobile telephone being configured to only establish a connection with the mobile-communication network when authorized by the external device through the near-field link.

14. The system according to claim 13, wherein the near-field communication device in the external device is a passive RFID device and the near-field communication device in the mobile telephone is an active RFID device.

* * * * *